United States Patent
Meckstroth

[11] 3,873,059
[45] Mar. 25, 1975

[54] PILOT OPERATED FLUID CONTROL VALVE

[76] Inventor: Alan F. Meckstroth, 2357 Sheltenwood Dr., Dayton, Ohio 45409

[22] Filed: Jan. 17, 1973

[21] Appl. No.: 324,506

[52] U.S. Cl................ 251/11, 137/270, 137/360, 137/387, 236/81, 251/45, 251/75
[51] Int. Cl. .................. F16k 31/02, F03g 7/06
[58] Field of Search ......... 251/11, 75, 45; 137/270, 137/360; 236/81, 80 F

[56] References Cited
UNITED STATES PATENTS

| | | | |
|---|---|---|---|
| 1,058,874 | 4/1913 | Larson | 236/81 |
| 2,211,301 | 7/1940 | Taylor | 236/80 F |
| 2,960,303 | 11/1960 | Smallpiece | 251/11 |
| 3,024,811 | 3/1962 | McKinley | 251/11 X |
| 3,643,913 | 2/1972 | McIntosh | 251/11 |
| 3,745,984 | 7/1973 | King | 251/11 X |

*Primary Examiner*—Arnold Rosenthal

[57] ABSTRACT

A valve body includes a base section having an inlet and an outlet and means forming a valve seat therebetween. A flexible diaphragm is supported for movement relative to the valve seat and includes a center by-pass port which is opened and closed by a valve member supported for axial movement by a closure section of the valve body. A needle-like actuating lever is pivotally supported by a flexible seal secured to the closure section and has an inner end portion projecting into an opening formed within the valve member. An elongated bimetallic actuating element has spaced leg portions mounted on the closure section of the valve body and includes a cantilevered head portion having an opening which receives the outer end portion of the actuating lever. A spring is compressed against the outer end of the actuating lever and causes an over-center rapid toggle action of the lever in response to slower movement of the head portion of the bimetallic actuating element which is preferably connected as a resistance in series with an electrical load. In a modification, the bimetallic actuating element is located within a cup which is formed as a part of the valve body and is positioned to receive an overflow of water from a tank which is supplied with water through the valve. The valve body is supported by an internally threaded tubular fitting having a flange with peripheral teeth for engaging a support bracket and providing for angular adjustment relative to the bracket.

15 Claims, 8 Drawing Figures

PATENTED MAR 25 1975  3,873,059
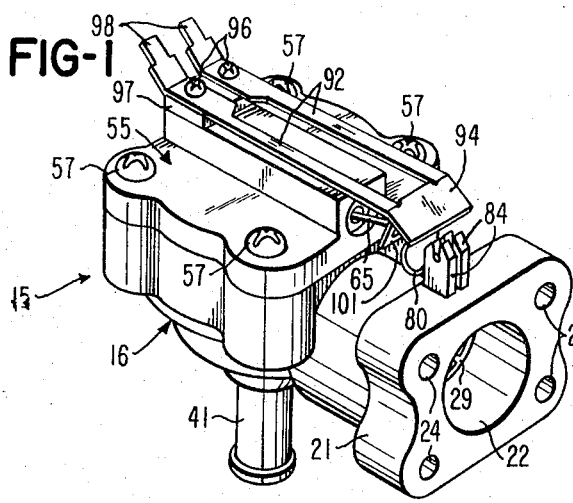
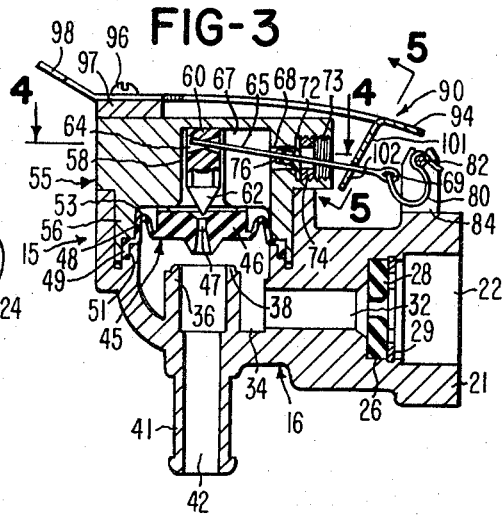
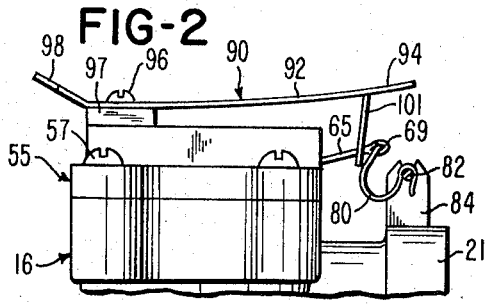
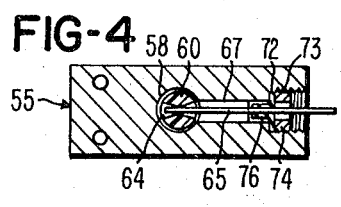
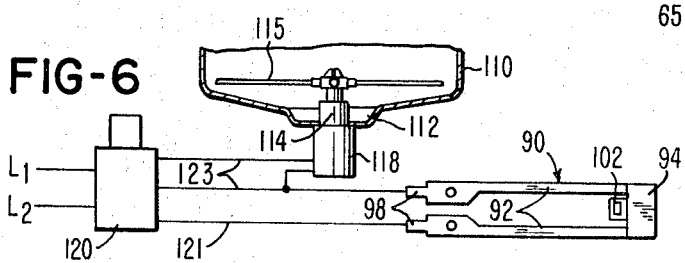
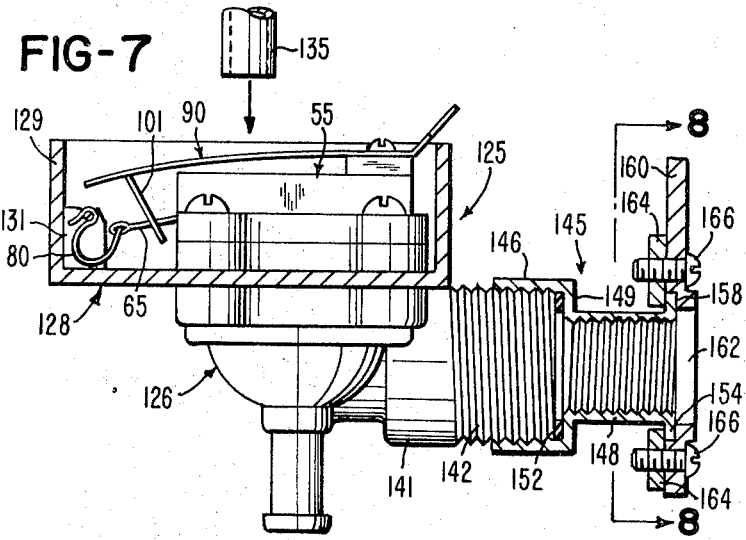
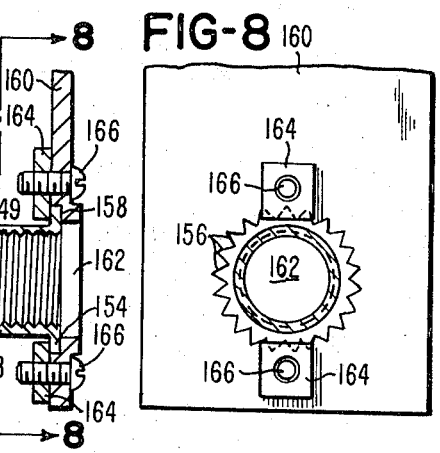

PILOT OPERATED FLUID CONTROL VALVE

BACKGROUND OF THE INVENTION

In the field of appliances such as clothes washing and dishwashing machines, it is common to employ one or more pilot operated water supply or fill valves which are actuated by one or more electrical solenoids. For example, dual inlet solenoid actuated control valves of the general type disclosed in U.S. Pat. No. 2,708,092, are used in automatic clothes washing machines, and single inlet solenoid actuated fill valves of the general type disclosed in U.S. Pat. No. 3,396,848, are commonly used in automatic dishwashing machines. The construction and operation of this particular form of solenoid operated water inlet or fill valve is well known in the art and does not require further discussion.

It has been determined that the solenoid actuator on such a pilot operated valve, produces an undesirable magnetic attraction of microscopic ferrous particles within the water supply, and an accumulation of these particles either on the spring biased metal armature or on the tube supporting the armature, sometimes causes sticking of the armature and prevents proper operation of the valve. In addition, the construction of the solenoid and the magnetically attractable armature and its enclosure, add significantly to the cost of the valve.

In the construction of gas fuel control valves, it is known to provide for direct actuation of the valve member with the use of a bimetallic element surrounded by an electrical heating coil. For example, U.S. Pats. No. 3,346,231 and 3,513,880 each disclose such a valve construction. It has also been proposed to employ similar bimetallic elements and surrounding electrical heating coils in a pilot operated diaphragm valve such as the modulating valve disclosed in U.S. Pat. No. 3,643,913. In this valve structure, a set of bimetallic blades are alternately heated and cooled in response to the temperature of the fluid flowing through the valve for modulating the flow by the pilot operated flexible diaphragm.

SUMMARY OF THE INVENTION

The present invention is directed to an improved pilot operated valve which is of simplified construction and is ideally suited for use in appliances such as a clothes washing and dishwashing machines to control the water supplied to the wash tank. However, it is to be understood that a valve constructed in accordance with the invention may be used in any other type of device wherein it is desired to provide an electrical control of the on-off flow of a fluid within the device.

In one embodiment of the invention, the conventional solenoid actuator is replaced by a U-shaped bimetallic actuating element which is adapted to be connected as a resistance in series with an electrical load such as a motor or heating element. The bimetallic actuating element includes generally parallel leg portions which are secured to a closure section of the valve body and are integrally connected by a head portion including a projecting tab having an aperture. A small diameter pin-like actuating lever is pivotally supported by a flexible annular seal and has an inner end portion projecting into a hole formed within the valve member which controls the flow of fluid through the center bypass port of the pressure actuated diaphragm. The outer end portion of the lever projects through the aperture within the tab of the bimetallic actuating element and is engaged by a compression spring. The spring is arranged to produce an overcenter toggle action of the lever in response to movement of the bimetallic actuating element between a normal generally flat position and a curved heated position.

In a modification, the valve body includes a cup-like portion which defines a chamber for receiving the bimetallic actuating element. The valve is positioned so that the chamber receives the initial overflow of water from a tank which is supplied with water through the valve. As a result, the bimetallic actuating element cools and returns the valve to its normally closed position even though the bimetallic actuating element remains electrically energized. The valve body is also adapted to be supported by a tubular metal fitting which has internally threaded tubular portions of different diameters. One end of the fitting has an outwardly projecting flange with peripherally spaced teeth to form a spline connection with a supporting bracket. The spline connection provides for angularly adjusting the position of the valve body relative to the supporting bracket.

Other features and advantages of the invention will be apparent from the following description, the accompanying drawing and the appended claims.

BRIEF DESCRIPTION OF THE DRAWING

FIG. 1 is a perspective view of a pilot operated fluid control valve constructed in accordance with the invention;

FIG. 2 is an elevational view of a portion of the valve shown in FIG. 1 and illustrating the valve in its normally closed position;

FIG. 3 is an axial section of the valve shown in FIG. 1 and illustrating the valve in its energized open position;

FIG. 4 is a section taken generally on the line 4—4 of FIG. 3;

FIG. 5 is a section taken generally on the line 5—5 of FIG. 3;

FIG. 6 is a diagrammatic illustration of a dishwashing machine incorporating a fluid control valve constructed in accordance with the invention;

FIG. 7 is an elevational view in part section of a modified form of fluid control valve constructed and supported in accordance with the invention and illustrating the valve in its open position; and FIG. 8 is a fragmentary section taken generally on the line 8—8 of FIG. 7.

DESCRIPTION OF THE PREFERRED EMBODIMENTS

The pilot operated fluid control valve shown in FIGS. 1–3 includes a valve body 15 consisting of a base portion or section 16 which is molded of a thermoplastics material such as nylon. The base section 16 includes an inlet portion 21 which defines a cylindrical inlet chamber 22 adapted to receive a cup-shaped fine mesh screen (not shown) for filtering the fluid or water supplied to the inlet chamber 22 through a water supply line (not shown). The supply line is coupled by a fitting (not shown) to the inlet portion 21 by a support bracket (not shown) and a set of screws threaded into the holes 24 spaced outwardly of the inlet chamber 22. A counterbore 26 extends inwardly from the inlet chamber 22 and receives a conventional rubber flow control washer 28 which automatically compensates for pressure variations in the water supplied to the inlet chamber 22. The resilient washer 28 is retained within the counterbore 26 by a C-shaped retaining ring 29.

A passage 32 extends from the flow washer 28 to a chamber 34 into which projects a tubular portion 36 defining an annular valve seat 38. The base section 16 also includes an outwardly projecting tubular portion 41 which cooperates with the tubular portion 36 to define an outlet passage 42. A resilient flexible rubber diaphragm 45 includes a hub portion 46 which is movable to engage the valve seat 38 and defines a center fluid bypass port 47. A flexible bellows-like flange portion 48 projects outwardly from the hub portion 46 and terminates with an integrally molded annular rim portion 49 which seats on an annular stepped surface 51 molded as part of the base section 16. A pair of small fluid bleed holes 53 are formed within the flange portion 48 of the diaphragm 45 and have a combined area less than that of the center bypass port 47. Up to this point, the structure described is generally well known in the art of solenoid actuated fluid control valves of the type referred to above.

In accordance with the present invention, the plastic valve body 15 also includes a cap-like closure section 55 which encloses the valve chamber 34 and is also molded of a thermoplastics material such as nylon. The closure section 55 includes a downwardly projecting annular portion 56 which has a stepped end surface contoured to confine the outer rim portion 49 of the diaphragm 45 and compress it against the surface 51 to form an annular fluid-tight seal between the base section 16 and the closure section 55. The closure section is secured to the base section 16 by a set of form screws 57 (FIG. 1).

A bore 58 is formed within the center of the closure section 55 and receives a plunger-like valve member 60 which is also preferably molded of a thermoplastics material. The valve member 60 is free to slide axially within the bore 58 and includes an inner pointed tip portion 62 which is positioned to effect closing of the center bypass port 47 within the diaphragm 45. An hourglass-shaped opening or hole 64 is formed within the upper end portion of the valve member 60 and receives the inner end portion of an elongated straight pin-like actuating lever 65.

The lever 65 projects into the bore 58 through a slot 67 and a small cylindrical opening 68 which has an axis normal to that of the bore 58. The lever 65 consists of a portion of a straight stainless steel needle which has an eye 69 and a diameter of approximately 0.040 inch. The lever 65 is pivotally supported by a thin circular rubber-like seal 72 which is compressed within a concentric bore 73 by an annular screw 74. The seal 72 includes an integrally molded tubular portion 76 which forms a press fit on the pin-like lever 65 and projects inwardly into the opening 68. A U-shaped compression spring 80 has a hook-like end portion which projects into the eye 69 of the lever 65. The opposite end portion of the spring 80 is pivotally supported by a cross pin 82 which is snap-fitted into recesses formed within the upper end portions of a pair of parallel spaced ears or projections 84 molded as an integral part of the base section 16.

An elongated resistance type bimetallic actuating element 90 includes a pair of generally parallel spaced leg portions 92 integrally connected by a head portion 94 to form a generally U-shaped configuration. The leg portions 92 are rigidly secured to the closure section 55 by a pair of screws 96 which extend through a phenolic spacer pad 97. A spade-like electrical terminal 98 forms the outer end of each of the leg portions 92 and is adapted to be connected in an electrical circuit as will be explained later. As a result of the mounting of the bimetallic actuating element 90 on the closure section 55 of the valve body 15, the head portion 94 of the actuating element is cantileverly supported from the spacer pad 97. An integral tab member 101 (FIGS. 3 and 5) projects downwardly as part of the head portion 94 of the actuating element 90 and includes a rectangular aperture or hole 102 which receives the outer projecting end portion of the pin-like actuating lever 65.

A typical use of a pilot operated fluid control valve constructed in accordance with the invention, is diagrammatically illustrated in FIG. 6. This use is for an automatic dishwashing machine which includes a tank 110 having a sump portion 112 in which is positioned a main recirculating pump 114 which supports a reactionary rotary spray-on 115. The pump 114 is driven by an electrical motor 118 which commonly has a rating of between one-third and one-half horsepower. The motor 118 is controlled by a motor driven cam actuated timer 120 which commonly receives a 115-volt power supply from power supply lines L1 and L2. The bimetallic actuating element 90 has one of its terminals 98 connected by a conductor 121 to the timer 120 and its other terminal 98 connected by a conductor 122 to one of the power supply conductors 123 extending between timer and the motor 118. Actuation of the timer 120 is effective to connect the bimetallic actuating element 90 in series with the motor 118 or to shunt the element 90 so that the power supply from the lines L1 and L2 is supplied directly to the motor 118.

The fluid control valve shown in FIGS. 1–5 operates in the following manner. When there is no current flowing through the actuating element 90, the element remains in its normal generally flat condition as shown in FIG. 2. In this normally deenergized position, the outer end portion of the actuating lever 65 is urged upwardly by the force exerted by the compression spring 80. As a result of the spring-like characteristics of the bimetallic actuating element 90, the element 90 may also be positioned so that the tab 101 exerts an upward force on the actuating lever 65. These forces acting upwardly on the outer end portion of the lever 65 cause the inner end portion of the lever 65 to exert a force downwardly on the valve member 60 so that the tip portion 62 of the valve member positively closes the upper end of the bypass port 47. When the port 47 is closed, the water flow through the bleed holes 53 increases the water pressure on the top side of the diaphragm 45 so that the diaphragm 45 engages the valve seat 38 and stops the flow of water through the outlet passage 42.

When it is desired to open the valve, an electrical current is directed through the bimetallic actuating element 90 which causes heating of the element. The actuating element 90 may be connected in series with the motor 118 at the time the motor is energized so that the momentary higher starting current required by the motor 118 is effective to heat the bimetallic element 90 quickly. For example, in one construction of the valve, the bimetallic actuating element 90 had a resistance of approximately 0.8 ohms so that it did not significantly reduce the voltage across the motor 118 which had an approximately one-half horsepower rating. The starting current of the motor 118 caused the actuating element 90 to be heated immediately and to deform to its curved heated position (FIG. 3) in only a fraction of a second.

When the actuating element curves to its heated position, the upper edge defining the hole 102 within the tab 101 of the actuating element 90, presses downwardly on the outer end portion of the actuating lever 65. This downward movement effects pivoting of the lever 65 in a clockwise direction (FIG. 3) so that the inner end portion of the lever 65 produces a lifting force on the valve member 60 and elevates the valve member to its open position (FIG. 3). When the outer end portion of the lever 65 is urged downwardly by the bimetallic actuating element 90, the outer end or eye 69 of the lever 65 passes through a center plane defined by the effective pivot axis of the seal 72 and the axis of the spring retaining pin 82. This produces an over-center toggle action of the lever 65 so that the spring 80 also urges downwardly on the outer end portion of the lever 65 to maintain the valve member 60 in its fully opened position (FIG. 3).

When it is desired to close the valve after a predetermined quantity of water has been supplied to the tank 110, the timer deenergizes the bimetallic actuating element 90 by producing a shunt across the contacts or terminals 98. When the bimetallic actuating element 90 is deenergized, heat is dissipated into the surrounding air, and the element 90 slowly returns to its normal position as shown in FIG. 2. As the head portion 94 of the element 90 rises, the depending tab 101 elevates relative to the outer end portion of the lever 65. When the bottom edge of the hole 102 engages the outer end portion of the lever 65, the lever 65 commences to pivot counterclockwise (FIG. 3) as the head portion 94 of the actuating element 90 moves upwardly. When the outer end portion or eye 69 of the lever 65 passes back through the center-plane, the compression spring 80 immediately urges upwardly on the outer end portion of the lever 65 causing rapid movement of the valve member 60 downwardly to its closed position blocking the flow of water through the bypass 47 hole.

Since the vertical dimensions of the hole 102 within the tab portion 101, is substantially greater than the diameter of the pin-like actuating lever 65, the lever 65 is free to pivot quickly in a counterclockwise direction when the eye 69 passes through the center plane to effect rapid closing of the valve member 60 against the diaphragm 45 which, in turn, effects rapid closing of the diaphragm 45 against the valve seat 38. This rapid closing of the valve is highly desirable in that it assures positive seating of the valve member 60 and the diaphragm 45 to avoid any leaking of water either through the bypass port 47 or around the valve seat 38.

Referring to FIGS. 7 and 8 which show a modified form of a pilot operated fluid control valve constructed in accordance with the invention, the valve body 125 is constructed substantially the same as the valve body 15 shown in FIG. 3 with the exception that the base section 126 includes a generally rectangular cup portion 128 which is molded as an integral part of the base section 126. The cup portion 128 includes an upwardly projecting frame-like side wall 129 which surrounds the closure section 55 and also the bimetallic actuating element 90. The cross pin 82 which retains the outer end portion of the compression spring 80, is snap-fitted into openings formed within a pair of parallel spaced ears or tabs 131 which are molded as an integral part of the cup portion 128.

Positioned above the valve body 125 is a vertical tube 135 which projects upwardly through the bottom wall of a dishwashing machine tank such as the tank 110 shown in FIG. 6. In the event that the motor driven timer 120 should fail to operate when the bimetallic actuating element 90 is energized, and the fluid control valve is in an open position, the continued supply of water to the tank would eventually begin to overflow through the tube 135 and would quickly fill the cup portion 128. When the overflow water contacts the bimetallic actuating element 90, which is still energized, heat is conducted from the element 90 at a rate faster than it is heated by resistance so that the actuating element 90 quickly cools and returns to its normal position as shown in FIG. 2. Thus the valve closes and the supply of water to the tank 110 stops. The water may be removed from the cup portion 128 by a removable plug (not shown).

The valve body also differs from the valve body 15 in that the valve body 125 includes a generally tubular inlet portion 141 having external threads 142. A tubular metal fitting 145 includes an internally threaded end portion 146 which engages the externally threaded inlet portion 141 of the valve body 125. The fitting 145 also includes a smaller diameter internally threaded tubular portion 148 which is integrally connected to the portion 146 by a radial flange portion 149. A resilient sealing ring or washer 152 is compressed between the flange portion 49 and the end of the tubular inlet portion 141 of the valve body 125 to form a fluid-tight seal between the valve body 125 and the fitting 145.

The fitting 145 also includes an outwardly projecting end flange portion 154 which has peripherally spaced teeth 156. The flange portion 154 and teeth 156 recess within a mating cavity 158 which is impressed within a heavy gauge sheet metal support bracket 160. A circular opening 162 is formed within the bracket 160 concentrically with the recess 158 and is adapted to receive the externally threaded end portion of a water supply line fitting (not shown) which is threaded into the tubular portion 148 of the fitting 145. The flange portion 154 and teeth 156 are secured within the cavity 158 by a pair of nuts 164 and corresponding screws 166 which extend through the bracket 160.

From the drawing and the above description, it is apparent that a pilot operated fluid control valve constructed in accordance with the present invention, provides desirable features and advantages. For example, the construction of the fill valve shown in FIG. 3 significantly reduces the cost of producing an electrically controllable valve. In addition, the bimetallic resistance element 90 eliminates the problem of magnetic attraction of ferrous particles within the water supply and thereby eliminates the resulting possibility of the valve member sticking.

Furthermore, the valve member 60 may be constructed of a plastics material which significantly reduces the cost of the valve member and the deposit of lime on the valve member. The bimetallic actuating element 90 also positively actuates the valve and assures that the valve closes when the actuating element is deenergized. In addition, the over-center actuation of the compression spring 80 cooperates with the small diameter lever 65 and the opening 102 within the actuating element 90 to provide for relatively quick closing of the valve member 60 in response to slower movement of the bimetallic actuating element 90. The small diameter actuating lever 65 also minimizes the force required to retain the lever against the fluid pressure acting on the inner end surface of the lever and thereby provides for the use of the small flexible seal 72 to minimize the force required to pivot the lever 65. The diameter of the lever 65 should be less than one-eighth inch and preferably less than one-sixteenth inch.

Another important feature is provided by the cup portion 128 of the valve body 125. That is, the cup portion 128 cooperates with the overflow tube 135 to effect closing of the control valve in the event that the control timer 120 fails to advance after the resistance actuating element 90 is energized. As a result, this structure eliminates the need for a separate overflow float actuated or pressure actuated protector switch which is commonly wired in series with the solenoid of a conventional solenoid actuated valve. Another important feature is provided by the tubular fitting 145 which provides a rigid support for the fluid control valve and also assures that any torque applied to the fitting 145 is transferred directly to the main support bracket 160 instead of to the valve body 115. In addition, the teeth 156 provide for fine angular adjustment of the flow control valve relative to the support bracket 160.

While the forms of valve assemblies herein described constitute preferred embodiments of the invention, it is to be understood that the invention is not limited to these precise forms of valves, and that changes may be made therein without departing from the scope and spirit of the invention as defined in the appended claims.

The invention having thus been described, the following is claimed:

1. A pilot operated fluid control valve comprising a valve body having an inlet and an outlet with a valve seat therebetween, a flexible diaphragm cooperating with said seat to control the flow of fluid from said inlet to said outlet and having means defining a bypass port, a movable valve member supported for movement between an open position and a closed position relative to said port to control the movement of said diaphragm by differential pressure across said diaphragm, a bimetallic actuating element supported by said valve body, means for connecting said actuating element as a resistance within an electrical circuit to effect heating of said actuating element and movement between a normal position and a heated position, an actuating lever having one end portion connected to said valve member, means including a flexible seal means for pivotally supporting said lever, a compression spring connected to the opposite end of said lever, and means supporting said spring for over-center toggle actuation of said lever in response to movement of said bimetallic actuating element between said normal and heated positions to produce relatively rapid movement of said valve member between said open and closed positions in response to slower movement of said actuating element.

2. A fluid control valve as defined in claim 1 wherein said bimetallic actuating element is elongated and includes generally parallel leg portions integrally connected by a head portion to define a generally U-shaped configuration, terminal means for connecting said leg portions within the electrical circuit, means for securing each of said leg portions to said valve body to effect cantilever support of said head portion, and means connecting said head portion of said element to said means for moving said valve member.

3. A fluid control valve as defined in claim 1 wherein said valve body includes a base section having said inlet and said outlet and said valve seat, a closure section secured to said base section and having a chamber for supporting said valve member, said bimetallic actuating element having generally parallel leg portions integrally connected by a head portion, means for securing said leg portions to said closure section, a tab member projecting from said head portion of said actuating lever, and means defining an opening within said tab portion for receiving said outer end portion of said actuating lever.

4. A fluid control valve as defined in claim 1 wherein said valve body includes an externally threaded tubular portion defining said inlet, a tubular metal fitting having a first internally threaded portion engaging said tubular portion of said valve body, said fitting including a second internally threaded portion projecting integrally from said first portion and having a smaller inside diameter to form an annular shoulder, a resilient sealing ring between said shoulder and said tubular portion of said valve body, a flange portion projecting outwardly from said second threaded portion of said fitting, a support bracket having an opening for receiving said second portion of said fitting, spline means including peripherally spaced teeth on said flange portion of said fitting and connecting said flange portion to said bracket to provide for the transfer of torque from said fitting directly to said bracket, and said spline means providing for adjustable angular orientation of said valve body relative to said bracket.

5. A pilot operated fluid control valve comprising a valve body having an inlet and an outlet with a valve seat therebetween, a flexible diaphragm cooperating with said seat to control the flow of fluid from said inlet to said outlet and having means defining a bypass port, a movable valve member supported for movement between an open position and a closed position relative to said port to control the movement of said diaphragm by differential pressure across said diaphragm, a bimetallic actuating element supported by said valve body, means for connecting said actuating element as a resistance within an electrical circuit to effect heating of said actuating element and movement between a normal position and a heated position, means for moving said valve member between said open and closed positions in response to movement of said actuating element between said normal and heated positions and including an elongated pin-like actuating lever, means including a flexible seal mounted on said valve body and pivotally supporting an intermediate portion of said lever, means connecting an inner end portion of said lever to said valve member, means connected to said bimetallic actuating element for engaging the outer end portion of said lever, and said latter means providing for movement of said actuating element without moving said actuating lever.

6. A fluid control valve as defined in claim 5 wherein said actuating lever has a diameter less than one-eighth inch.

7. A fluid control valve as defined in claim 6 wherein said valve member includes means defining an opening extending laterally therethrough, and said inner end portion of said actuating lever projects into said opening.

8. A fluid control valve as defined in claim 5 wherein said actuating lever has a diameter less than one-sixteenth inch.

9. A fluid control valve as defined in claim 5 including a compression spring connected to said outer end portion of said actuating lever, and means supporting said spring for over-center toggle actuation in response to movement of said bimetallic actuating element to effect relatively rapid movement of said valve member in response to slower movement of said actuating element.

10. A pilot operated fluid control valve comprising a valve body having means defining a fluid inlet and a fluid outlet with a valve seat therebetween, a flexible diaphragm positioned adjacent said seat for movement between a closed position engaging said seat and an open position spaced from said seat, means for directing fluid from said inlet to both sides of said diaphragm, means defining a bypass port within said diaphragm and providing for a flow of fluid through said diaphragm, a valve member supported for movement between a closed position closing said port and an open position spaced from said port to control movement of said diaphragm by differential pressure, an elongated generally U-shaped bimetallic actuating element having leg portions secured to said valve body, a head portion connecting said leg portions and being movable between a normal position and a heated position in response to heating and cooling of said actuating element, lever means for moving said valve member from said closed position to said open position in response to movement of said head portion of actuating element from said normal position to said heated position, terminal means for connecting said actuating element as a resistance within an electrical circuit to effect resistance heating of said actuating element, and spring means for moving said lever means and said valve member at a rate faster than said head portion of said actuating element to effect relatively rapid movement of said valve member to said closed position.

11. A fluid control valve as defined in claim 10 including means forming a cup-like liquid retaining chamber on said valve body for receiving said bimetallic actuating element, and means defining an opening for directing a liquid into said chamber.

12. A pilot operated fluid control valve comprising a valve body having an inlet and an outlet with a valve seat therebetween, a flexible diaphragm cooperating with said seat to control the flow of fluid from said inlet to said outlet and having means defining a bypass port, a movable valve member supported for linear movement on an axis between an open position and a closed position relative to said port to control the movement of said diaphragm by differential pressure across said diaphragm, an elongated pin-like actuating lever, means including a flexible seal mounted on said valve body and supporting an intermediate portion of said lever for pivotal movement of said lever, means connecting one end portion of said lever to said valve member, an elongated bimetallic actuating element mounted on said valve body and extending generally parallel to said lever and generally normal to said axis, means for heating said actuating element to effect movement of an actuation portion of said actuating element between a normal position and a heated position, means connecting said actuating portion to the opposite end portion of said lever for moving said valve member between said open and closed positions in repsonse to movement of said actuating portion between said normal and heated positions, and spring means for causing relatively rapid movement of said lever and said valve member in response to slower movement of said actuating portion of said actuating element.

13. A fluid control valve as defined in claim 12 wherein said spring means include a compression spring connected to said opposite end portion of said lever, and means supporting said spring for over-center toggle actuation of said lever in response to movement of said actuating portion between said normal and heated positions.

14. A pilot operated fluid control valve comprising a valve body including a base section and a closure section, said base section having an inlet and an outlet with a valve seat therebetween, a flexible diaphragm cooperating with said seat to control the flow of fluid from said inlet to said outlet and having means defining a bypass port, a valve member supported by said closure section for generally linear movement on an axis between an open position and a closed position relative to said port to control the movement of said diaphragm by differential pressure across said diaphragm, an elongated actuating lever extending generally normal to said axis, means including a flexible seal on said closure section of said valve body for supporting an intermediate portion of said lever for pivotal movement of said lever, means connecting the inner end portion of said lever to said valve member, an elongated bimetallic actuating element supported by said closure section of said valve body and positioned generally normal to the axis of said valve member, means for heating said actuating element to effect movement of a portion of said element between a normal position and a heated position, means for moving the outer end portion of said lever in response to movement of said portion of said actuating element between said normal and heated positions to effect movement of said valve member between said open and closed positions, and said latter means including spring means connected to said lever and effective to cause relatively rapid movement of said lever and said valve member in response to slower movement of said portion of said actuating element.

15. A pilot operated fluid control valve comprising a valve body having an externally threaded inlet portion and a tubular outlet portion with a valve seat therebetween, a flexible diaphragm cooperating with said seat to control the flow of fluid from said inlet to said outlet and having means defining a bypass port, a movable valve member supported for movement between an open position and a closed position relative to said port to control the movement of said diaphragm by differential pressure across said diaphragm, electrically actuated means supported by said valve body for moving said valve member, a tubular support fitting for said valve body and including a first internally threaded end portion engaging said inlet portion of said valve body, a second internally threaded tubular portion projecting from said first end portion of said fitting and adapted to receive a fluid supply line, said second portion having a diameter smaller than that of said first portion to form an internal annular shoulder, means forming a fluid-tight seal between said shoulder and said inlet portion of said fitting, a flange portion projecting outwardly from the end of said second tubular portion and having peripherally spaced teeth, a support bracket having a splined cavity for receiving said flange portion of said fitting and said teeth in interfitting relation, and means for securing said flange portion of said fitting to said support bracket.

* * * * *